No. 811,169. PATENTED JAN. 30, 1906.
F. E. PARRISH, DEC'D.
S. M. P. HOLMES, ADMINISTRATRIX.
EDUCATIONAL APPARATUS.
APPLICATION FILED SEPT. 6, 1905.
3 SHEETS—SHEET 1.
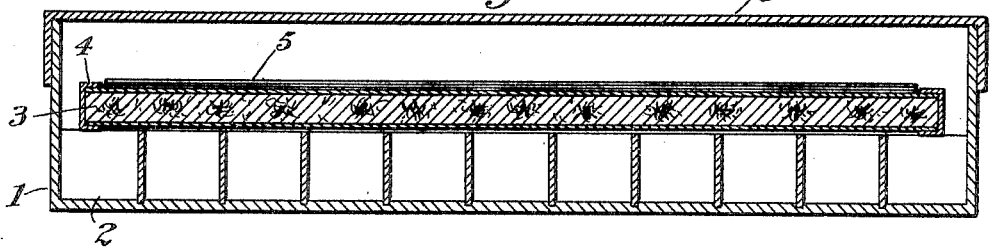
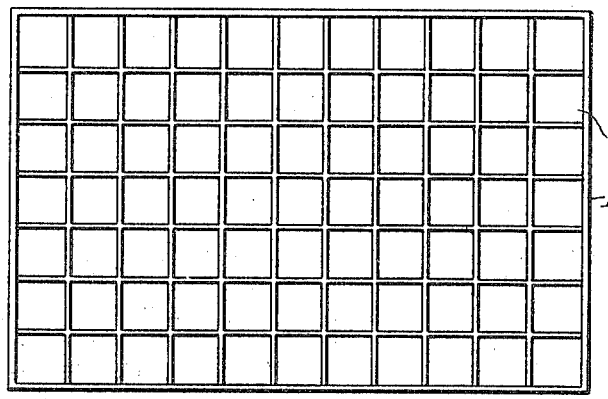
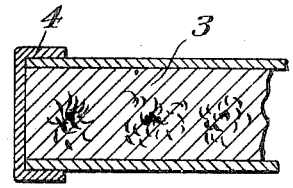
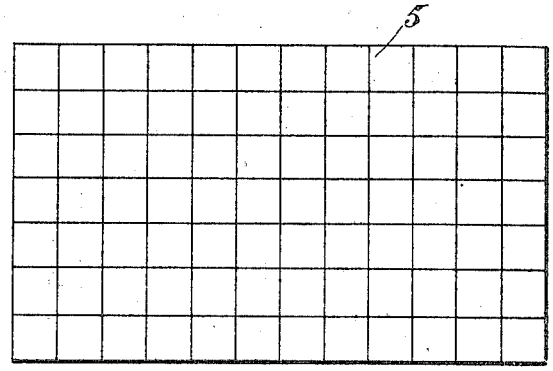
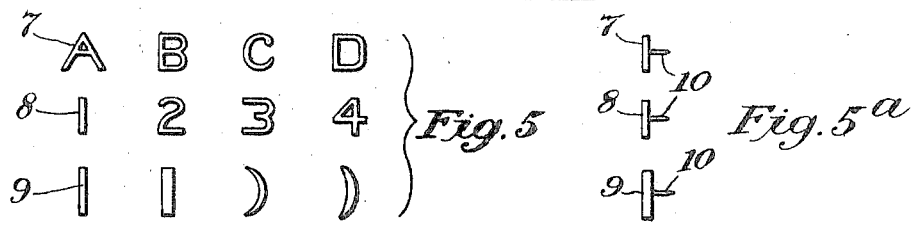

No. 811,169. PATENTED JAN. 30, 1906.
F. E. PARRISH, DEC'D.
S. M. P. HOLMES, ADMINISTRATRIX.
EDUCATIONAL APPARATUS.
APPLICATION FILED SEPT. 6, 1905.
2 SHEETS—SHEET 2.
Fig. 6
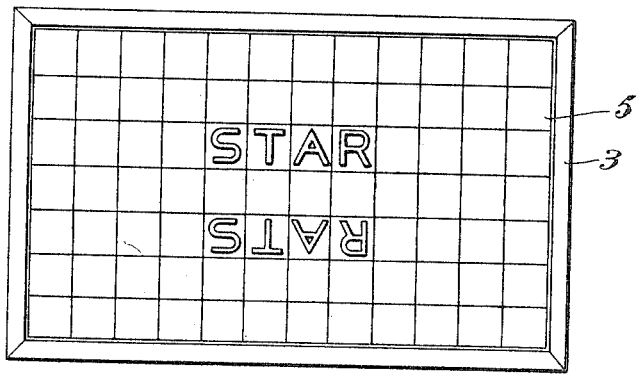
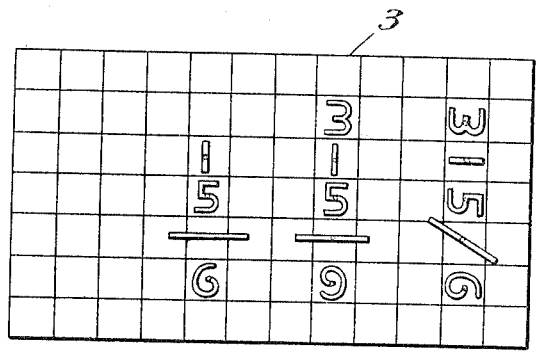
Fig. 7
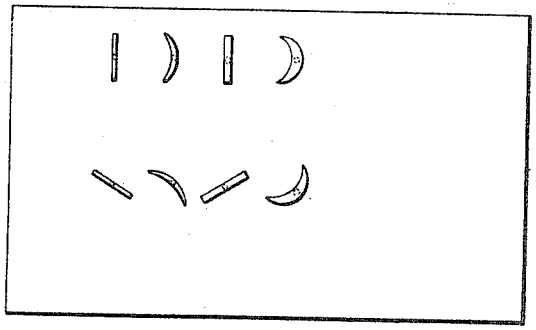
Fig. 8
Witnesses:
Emily I. Caughlan
C. Kaufmann.
Inventor:
Francis E. Parrish
by Davis & Davis
her Attys.

UNITED STATES PATENT OFFICE.

FRANCES E. PARRISH, OF NEW YORK, N. Y.; SUSAN M. PARRISH HOLMES ADMINISTRATRIX OF SAID FRANCES E. PARRISH, DECEASED.

EDUCATIONAL APPARATUS.

No. 811,169.  Specification of Letters Patent.  Patented Jan. 30, 1906.

Application filed September 6, 1905. Serial No. 277,166.

*To all whom it may concern:*

Be it known that I, FRANCES E. PARRISH, a citizen of the United States, residing in the borough of Manhattan, city, county, and State of New York, have invented certain new and useful Improvements in Educational Apparatus, of which the following is a specification, reference being had therein to the accompanying drawings, in which—

Figure 1 is a vertical longitudinal sectional view of the complete apparatus; Fig. 2, a plan view of the receptacle for containing the characters or symbols used; Fig. 3, a plan view of one of the guide-sheets; Fig. 4, a detail sectional view of one end of the tablet or support; Fig. 5, a detail view showing the face of the characters employed; Fig. 5ª, an edge elevation of said characters; Figs. 6, 7, and 8, detail views illustrating the method of using apparatus.

This invention relates to improvements in that class of educational apparatus wherein it is sought to teach by the actual use of characters and objects by the student and the arrangement of said objects and characters in proper order and arrangement to express the idea to be conveyed to the student.

The invention consists, primarily, of supplying characters or objects which are adapted to be used by primary scholars in the study of any particular subject and providing said objects each with a pivot by which it may be detachably connected to a suitable support, it being the object of the invention to require the child to select the object from a group and then by means of the pivot secure it in its proper position on the support. The characters are provided with a single pivot in order that when it is secured to its support it may be rotated on said pivot to place it in any desired position or angular relation with respect to a horizontal line.

Referring to the various parts by numerals, 1 designates a suitable box or receptacle provided with a large number of small compartments 2, which are adapted to contain the characters or objects used in the apparatus. As a convenient support for the pivoted characters a tablet 3 is provided. This tablet is formed of cork composition covered with paper, which is glued thereto, the whole being bound with some durable material, as at 4. This tablet forms a soft support into which the pivots of the figures or other characters may be readily forced.

To enable the child to arrange the symbols or characters in regular lines on the tablet 1, provided sheets of paper 5, ruled in small squares formed by vertical and horizontal lines, one of said sheets being shown in Fig. 3. A pad of these sheets is supplied with each apparatus. These sheets effectually protect the cork tablet and serve to keep it clean, said sheets being simply laid on the tablet, the pivoted characters serving to hold it in place. This sheet also serves as an exercise-sheet on which the child may write the letters and exercises printed out with the characters or symbols, thereby enabling the teacher to instruct the child in spelling and penmanship with the same apparatus. A cover 6 is provided for the receptacle 1.

I have shown in the drawings characters 7, consisting of letters of the English alphabet, and characters 9, which are symbols used in "phonic shorthand," these latter symbols constituting the shorthand alphabet. I have also shown numerals 8. These characters and symbols are each provided with a single pivotal projection 10, which is adapted to be passed through the guide-sheet and into the cork tablet, said pivots being located, as near as may be, at the center of the character, so that said characters may be rotated on a central pivot after they have been secured to the tablet.

The purpose or object of pivoting the characters is to permit the child to rotate them after they have been attached to the supporting-tablet to secure various effects and results. For instance, the child will be instructed to spell the word "star" by attaching the proper letters to the cork tablet in proper relation. It will then be instructed to rotate the letters until they are reversed or upside down, as illustrated in Fig. 6, and to then reverse the board—that is, turn it upside down. The child will then see that the same letters reversed spell the word "rats." It will at once be seen that many other combinations of letters may be made and then reversed, thus providing an instructive and amusing exercise or game by which the child will readily learn the spelling of words, word-building, and construction of sentences, transposition of letters into other words, &c., thus developing the natural individuality of the child.

By the use of the pivoted numerals exercises in arithmetic may be carried out. For instance, the numerals "5" and "1" may be arranged in a vertical column for addition, one of the phonetic symbols being used as a line under the column and the numeral "6" being used below the line to show the sum of the two numbers. Now the numeral "3" may be added to the top of the column and the numeral "6" rotated on its pivot to read "9," showing the sum of the three numbers, as illustrated in Fig. 7. The numerals may then be rotated on their pivots and the board turned on its side edge, so that they will read "31⅚" or "31⅝" by reversing the numeral "9." Many other combinations of numerals may be used, which combinations will readily occur to the ingenious and resourceful teacher. It is evident that these pivoted figures will enable the child to make rapid calculations in addition, subtraction, multiplication, and division.

The four primary symbols of the phonic shorthand alphabet may be rotated by the student and placed in the proper angular relation with respect to a horizontal line to indicate all of the characters or symbols of said alphabet. If desired, special characters—such as dots and dashes, suffixes and affixes, and phrase-symbols—may be provided, these being used in connection with the primary symbols. It will thus be seen that an important feature of the invention as applied to the shorthand symbols is the means by which said symbols may be pivoted upon their support in such manner that they may be rotated and their angular relations readily changed. The phonic shorthand characters shown consist merely of two straight lines of different widths and two curved lines of different widths. These symbols being arranged in various positions, as shown in Fig. 8, indicate consonants, the vowels being indicated by dots and dashes properly arranged with respect to the consonant symbols. It will be readily understood that the invention is capable of broad application and may be applied to a great variety of studies.

From the foregoing it will be readily seen that the apparatus is invaluable in kindergarten and primary instruction, as by placing visually before the pupil a perfect letter, type, or character, wherewith he may print the name of any object, or number of numerals the mind of the pupil is stimulated and trained in concentration, definition, description, classification, and observation by the natural process of analysis, while in exercises in mental arithmetic, spelling, and the use of words and composition the pupil's memory is quickened and the senses so trained that the child's mind is harmonized with the natural method of clear thinking.

What I claim as new, and desire to secure by Letters Patent, is—

1. An educational apparatus comprising a tablet or support, a series of characters or symbols adapted to be removably placed thereon, and a guide and exercise sheet adapted to be placed over the tablet and detachably secured thereon by the characters.

2. An educational apparatus comprising a tablet or support, a series of characters or symbols provided with pins by which they are adapted to be removably secured to the tablet, and a guide-sheet adapted to be placed over the tablet and detachably secured thereon by the characters.

3. An educational apparatus comprising a support, a series of characters or symbols, a pivot-pin connected to each of said characters and by which said character may be detachably and rotatably secured to the support, and an exercise-sheet adapted to be placed over the tablet and detachably secured thereon by the characters.

4. An educational apparatus comprising a main receptacle provided with a plurality of small compartments, a series of instruction characters or symbols adapted to be arranged in said compartments, a pin-like pivot connected to each of said characters, and a soft tablet adapted to fit within said main receptacle and to form a support for the characters, and a cover for said receptacle.

5. An educational apparatus comprising a main receptacle provided with a plurality of small compartments, a series of instruction characters or symbols adapted to be arranged in said compartments, a pin-like pivot connected to each of said characters, and a soft tablet adapted to fit within said main receptacle and to form a support for the characters, and a protecting exercise-sheet adapted to cover said tablet and to be detachably secured thereto by the characters, and a cover for said receptacle.

In testimony whereof I hereunto affix my signature, in the presence of two witnesses, this 24th day of August, 1905.

FRANCES E. PARRISH.

Witnesses:
WM. R. DAVIS,
ROYAL B. CUSHING.